(12) United States Patent
Riegel et al.

(10) Patent No.: US 7,722,834 B2
(45) Date of Patent: May 25, 2010

(54) RECOMBINER SYSTEM

(75) Inventors: Bernhard Riegel, Brilon (DE); Jean Ruch, Brilon (DE); Eduardo Cattaneo, Briolon (DE)

(73) Assignee: Hoppecke Technologies GmbH & Co. (DE)

( * ) Notice: Subject to any disclaimer, the term of this patent is extended or adjusted under 35 U.S.C. 154(b) by 376 days.

(21) Appl. No.: 11/665,585

(22) PCT Filed: Dec. 23, 2005

(86) PCT No.: PCT/EP2005/014002

§ 371 (c)(1),
(2), (4) Date: Apr. 17, 2007

(87) PCT Pub. No.: WO2006/069758

PCT Pub. Date: Jul. 6, 2006

(65) Prior Publication Data

US 2008/0166275 A1    Jul. 10, 2008

(30) Foreign Application Priority Data

Dec. 23, 2004 (DE) ................... 040 30 535

(51) Int. Cl.
*B01J 8/02* (2006.01)
*B01J 8/04* (2006.01)
*B01J 12/00* (2006.01)
*C01B 5/00* (2006.01)

(52) U.S. Cl. ............ 422/211; 422/188; 422/191; 376/300; 376/301

(58) Field of Classification Search ............ 422/211, 422/191, 188; 376/300, 301
See application file for complete search history.

(56) References Cited

U.S. PATENT DOCUMENTS

| | | | |
|---|---|---|---|
| 2,943,921 A * | 7/1960 | Percival | 422/117 |
| 3,857,927 A | 12/1974 | Henrie | |
| 4,002,496 A * | 1/1977 | Nitta et al. | 429/53 |
| 4,008,050 A | 2/1977 | Betz | |
| 4,048,387 A | 9/1977 | Lahme et al. | |
| 4,139,603 A * | 2/1979 | Weems et al. | 423/580.1 |
| 4,228,132 A * | 10/1980 | Weems et al. | 422/174 |
| 5,108,714 A * | 4/1992 | Iwata et al. | 422/159 |
| 5,167,908 A * | 12/1992 | Chakraborty | 376/301 |
| 6,254,841 B1 * | 7/2001 | Kesper et al. | 422/211 |
| 2001/0042344 A1 | 11/2001 | Ohmi et al. | |
| 2003/0161786 A1 * | 8/2003 | Eckardt | 423/659 |

FOREIGN PATENT DOCUMENTS

CN     1275248 A    11/2000

* cited by examiner

*Primary Examiner*—Walter D Griffin
*Assistant Examiner*—Huy-Tram Nguyen
(74) *Attorney, Agent, or Firm*—Gottlieb, Rackman & Reisman, P.C.

(57) ABSTRACT

The invention relates to a recombiner system (1) for catalytically recombining hydrogen that is produced in energy accumulators or energy converters. The aim of the invention is to provide a recombiner system (1) which can optionally be used for energy accumulator or energy converter systems having different operating conditions and that helps to counteract functional defects. For this purpose, the recombiner system (1) is formed by individual recombiner elements (2) that can be combined with each other in a modular fashion, said recombiner elements (2) comprising at least one respective catalyst (12).

17 Claims, 4 Drawing Sheets

RECOMBINER SYSTEM

The invention relates to a recombiner system for catalytically recombining hydrogen that is produced in energy accumulators or energy converters.

Recombiner systems of the above mentioned type are well known from the state of the art, whereby it is not necessary to make reference to particular documents.

It is known that recombiner systems have a catalyst. As catalysts, over all platinum metals are known, in particular palladium that is applied in form of a thin layer to a carrier rod that can for example be made of copper, alumina or the like. The thus formed catalyst rod is centrically inserted in a tube made of porous material, for example a gas permeable ceramic tube, wherein the annular space that remains in the tube between the catalyst rod on the one hand and the inner surface of the tube on the other hand is filled with absorption material. In particular lead oxides, silver oxides, iron oxides, copper oxides, aluminum oxides, manganese oxides or the like are suitable as absorption materials. The tube that receives the catalyst rod and the absorption material is usually arranged in a self-supporting manner inside a gas-tight container, preferably a plastic container, which container is closed on the faces. The container in turn has socket pieces for being connected to an accumulator for the gas supply on the one hand and the water discharge on the other hand.

The gases hydrogen and oxygen that are produced during the operation of an accumulator, in particular during the charging operation, are introduced into the container via the one socket piece of the container, then pass there through the porous tube and the adsorption material and are then recombined to form water at the catalyst. The recombining reaction is exothermal, which is the reason why the water that has been recombined at the catalyst is at first present as water vapour. The water vapour that is produced at the catalyst then precipitates on the inner wall of the container, condenses and flows back into the accumulator via the socket piece that is provided for this.

The advantage related to the use of a recombiner of the above described type is obvious. The gases hydrogen and oxygen that are released during the operation of an accumulator are recombined by the recombiner system to form water which will not be lost but returned into the electrolyte of the accumulator. It is thus not necessary to refill distilled water into the electrolyte of the accumulator. In so far, an accumulator provided with one or more recombiner systems depending on the size of the accumulator does not require any maintenance.

Although recombiners or recombiner systems of the above described type have proved to be successful in practice, they nevertheless present drawbacks.

Depending on the capacity of the accumulator, i.e. depending on the quantity of hydrogen and oxygen that is released within the operation of the accumulator, the recombining capacity of a recombiner has to be dimensioned. As a result the recombining capacity of a recombiner has to match the capacity of the accumulator. As a consequence, different recombiners have to be used for different accumulator sizes, which makes the production of recombiners complex and expensive. Furthermore, the known recombining systems have the drawback that the adsorption material is wetted by the water vapour that is produced at the catalyst at non predeterminable points which can lead to an at least temporary functional breakdown at these points. Hereby, the recombining capacity of the recombiner is affected negatively.

Based upon the above described state of the art, it is the object of the invention to provide a recombiner system which can optionally be used for energy accumulator or energy converter systems having different operating conditions and which helps to counteract partial functional defects, while avoiding the above mentioned drawbacks.

For technically achieving this aim, the invention proposes a recombiner system for catalytically recombining hydrogen that is produced in energy accumulators or energy converters, the system being formed by individual recombiner elements that can be combined with each other in a modular manner, said recombiner elements respectively comprising at least one catalyst.

Energy accumulators or energy converters in the sense of the invention are accumulators, for example nickel cadmium accumulators, lead accumulators or similar accumulators as well as other systems such as for example fuel cells or the like.

In contrast to the state of the art, the invention does not intend to use recombiner systems as such with a given structure, but to provide instead individual recombiner elements presenting an identical or different structure that can be combined with each other to form a recombiner system depending on the required recombining capacity. Depending on the number of the used recombiner elements, the recombination is then performed in several stages and thereby more efficiently.

The most important element of a recombiner system is the catalyst. The catalyst can be formed by a carrier element that is coated with for example an element of the transition group, in particular a metal of the platinum group. A recombiner system is composed of a plurality of individual recombiner elements, wherein the recombiner elements can be combined with each other in a modular manner. "In a modular manner" in the sense of the invention means that there are recombiner elements which are different with respect to the form, the size, the recombining capacity thereof and the like and which can be selectively combined with each other depending on the recombiner system that shall be formed in total. Thus, it is advantageously made possible to use standardised recombiner elements in order to form very different recombiner systems. In contrast to the recombiner systems known from the state of the art, the manufacture of the same ones is thus simplified and also made cheaper, because it is no longer necessary to provide recombiner systems that are adapted to their later use, i.e. to the capacity of the accumulator, since corresponding recombiner systems can be optionally assembled by combining different recombiner elements.

For the purpose of forming the recombiner system according to the invention, a plurality of individual recombiner elements have to be superposed, preferably in the vertical direction. Two alternative embodiments are imaginable.

According to a first embodiment, the catalyst of each recombiner element is encompassed by a casing made of porous material. If a plurality of recombiner elements is superposed in the vertical direction, a bar-like structure of the recombiner system is formed which is composed of a catalyst on the one hand and a casing made of a porous material on the other hand. Herein, the most upper recombiner element, seen in the vertical direction, is provided with a closing element according to another proposal of the invention. This closing element can have the form of a cover and can also be made of a porous material such as for example ceramic. Beneath the recombiner element that is the lowest in the vertical direction an absorber is placed that is made of an absorption material which can be in a known way lead oxide, silver oxide, iron oxide, copper oxide, aluminum oxide, manganese oxide or the like.

According to a second alternative embodiment of the invention it can be provided that the recombiner elements are superposed in the vertical direction inside a tube made of porous material, for example ceramic, and closed at one end, wherein the inner diameter of the tube essentially corresponds to the outer diameters of the recombiner elements. In contrast to the first alternative, not each recombiner element itself has a casing made of porous material, but it is rather provided that the individual recombiner elements are received by a common tube made of a porous material. As a result a recombiner system is created that is formed by one tube made of porous material, which tube receives a plurality of recombiner elements that are superposed in the vertical direction. At the other end of the tube an absorber made of an absorption material is placed inside the tube, wherein the outer diameter of the absorber essentially corresponds to the inner diameter of the tube.

Both above described embodiments have in common that the catalyst of the recombiner system is not completely encompassed by an absorption material, as previously known from the state of the art. The absorber made of an absorption material is rather located beneath the catalyst with respect to the vertical direction of the recombiner system. This special arrangement of the invention has the advantage that wetting of the absorber, in particular with an only low charging current, can be almost avoided. The gases hydrogen and oxygen that escape from the accumulator are at first guided through the absorber located beneath the catalyst of the recombiner system before they reach the volume space of the recombiner. The gases entering the recombiner are purified in this way and in particular freed from hydrides. In so far, the absorber acts as a filter. The purified gases hydrogen and oxygen then get into the volume interior encompassed by the recombiner and are recombined at the catalyst to form water. The water vapour that is generated at the catalyst due to the recombination precipitates at the inner surface of the container of the recombiner and condenses.

Since the absorber is provided beneath the catalyst with respect to the vertical extension of the recombiner system and not in the direct vicinity of the catalyst, as provided in the recombiner systems known from the state of the art, the absorber is wetted less, since the water vapour generated at the catalyst is not guided through the absorber. This arrangement is advantageous, in particular with a low charging current, since the exothermal effect of the recombination is comparatively small if only a low charging current is applied. In the past this often led to wetting of the absorption material that was placed close to the catalyst and that dried only very slowly due to the comparatively small exothermal effect. In order to solve this problem, there are approaches to dry the absorption material by means of additional heating elements. The hereby expensive and complex structure of the recombiner can be avoided using the recombiner system according to the invention. Since according to this embodiment of the invention, the absorber is not placed in the direct vicinity of the catalyst, this one is wetted less, such that the heat that is released even in a low charging operation is sufficient for drying the absorber, i.e. the absorption material. Partial functional breakdowns can thus be advantageously avoided.

The embodiment according to the invention permits a multistage recombination process. Before the true recombination of the gases hydrogen and oxygen to form water is carried out at the catalyst, the gases are guided through the absorber placed beneath the catalyst, whereby the gases are purified. The then purified gases are submitted to the true recombination process. This multistage process offers the already above described advantages. Furthermore, the actual recombination process is carried out in several steps depending on the used recombiner elements, which improves the recombination output.

In an alternative embodiment of the invention it can be provided that the recombiner elements respectively present at least one modular catalyst group composed of a catalyst and an absorption material that surrounds the catalyst. Herein, the absorption material encompasses the catalyst like an envelope. Thus formed recombiner elements can also be advantageously combined with each other in a modular manner to form a complete recombiner system.

In contrast to the first embodiment of the invention, the absorber made of an absorption material is not placed beneath the catalyst, but encompasses the catalyst, wherein each recombiner element of the recombiner system has a corresponding absorption material. Since the recombiner system is composed of individual recombiner elements that are superposed in the vertical direction, it is possible to substantially avoid an uncontrolled, partial functional breakdown of the absorption material, because the recombination carried out by the recombiner system according to the invention is realized in several stages due to the fact that the recombiner system is formed by a plurality of individual recombiner elements. If namely the absorption material of a recombiner element is wetted due to a recombination, the absorption material of the other recombiner elements of the recombiner system will not be concerned by this, such that the absorption material of the other recombiner elements will remain dry. The wetting of the absorption material of a recombiner element thus does advantageously not spread among the absorption material of the other recombiner elements. In this way, a wetting of the absorption material that is eventually caused during a recombination can be controlled, which makes it possible to dimension the recombination capacity of the entire recombiner system in accordance with the wetting of the absorption material that takes place during an intended use of the recombiner system, by means of the combination of a corresponding number of recombiner elements. The recombiner system according to the invention thus proves much more reliable than the recombiner systems known from the state of the art.

In order to increase the functional reliability of the recombiner system, it can be optionally provided according to a special proposal of the invention that the individual recombiner elements of the recombiner system are combined with each other by respectively interposing a separation means. The separation means can preferably be made of a porous material which allows the passage of the gases hydrogen and oxygen, but which simultaneously prevents that the water vapour gets from one recombiner element to another recombiner element, which can be for example achieved in that the material of which the separation means is made has another density than the porous material that encompasses the recombiner elements. In this way, the multistage recombination process realized by the recombiner system according to the invention is additionally supported. Herein, separation means of different thickness can be both used alternatively and in a combined manner, depending on the design of the recombiner system.

According to another aspect of the invention, it is provided that the recombiner elements which have a catalyst group in the above described way are superposed in the vertical direction inside a tube made of porous material, one end of which is closed, wherein the inner diameter of the tube essentially corresponds to the outer diameters of the recombiner elements. According to this embodiment of the invention, the porous material that encompasses the absorption material of the recombiner elements is provided by means of a tube, wherein the recombiner elements have to be placed inside a tube for forming the recombiner system. Depending on the required recombination capacity, a corresponding number of recombiner elements have to be introduced into a correspondingly long tube of the above described type for forming the recombiner system according to the invention. If, as described above, separation means that separate the individual recombiner elements from each other shall be used, the tube has to be correspondingly longer. The recombiner system that is composed of recombiner elements, eventually separation means, and a tube can then be positioned inside the container that is provided by the recombiner.

According to an alternative embodiment of the invention, the catalyst group of each recombiner element is encompassed by a casing made of porous material. According to this alternative embodiment of the invention, a tube for receiving the recombiner elements is not required. Each of the individual recombiner elements is in turn provided with a casing made of porous material that encompasses the absorption material, such that only the recombiner elements of the above described type have to be combined with each other for forming the recombiner system according to the invention. The individual recombiner elements are preferably superposed in the vertical direction, wherein the most upper recombiner element in the vertical direction can be provided with a closing element. Herein, the closing element may have the form of a cover and be made of a porous material, such as for example ceramic.

In order to ensure a position-safe connection of the individual recombiner elements for forming a common recombiner system, it can be provided according to another characteristic of the invention that the large faces of the individual recombiner elements carry fasteners. This special embodiment of the invention can be provided for both recombiner elements that only comprise a catalyst according to the first embodiment and recombiner elements that have a modular catalyst group according to the second embodiment. Suitable fasteners can be for example bayonet catches, plug-in locks, catch seals or the like. It is only important that the fasteners take care that the recombiner elements or the absorbers that are superposed in the vertical direction are fixed in a position-safe manner with respect to each other and cannot be displaced with respect to each other. However, the use of fasteners is purely optional and not compulsory. Thus, such fasteners can be omitted, if the individual recombiner elements of the recombiner system are arranged within a tube, as described above. In this case the tube that encompasses the recombiner elements provides a position-safe hold of the individual recombiner elements. As supplement to the above described aspects it has to be noted that a connection of the individual recombiner elements can also be realized by gluing.

Other advantages and characteristics of the invention will appear from the description with reference to the following figures. Herein:

Figure 1:
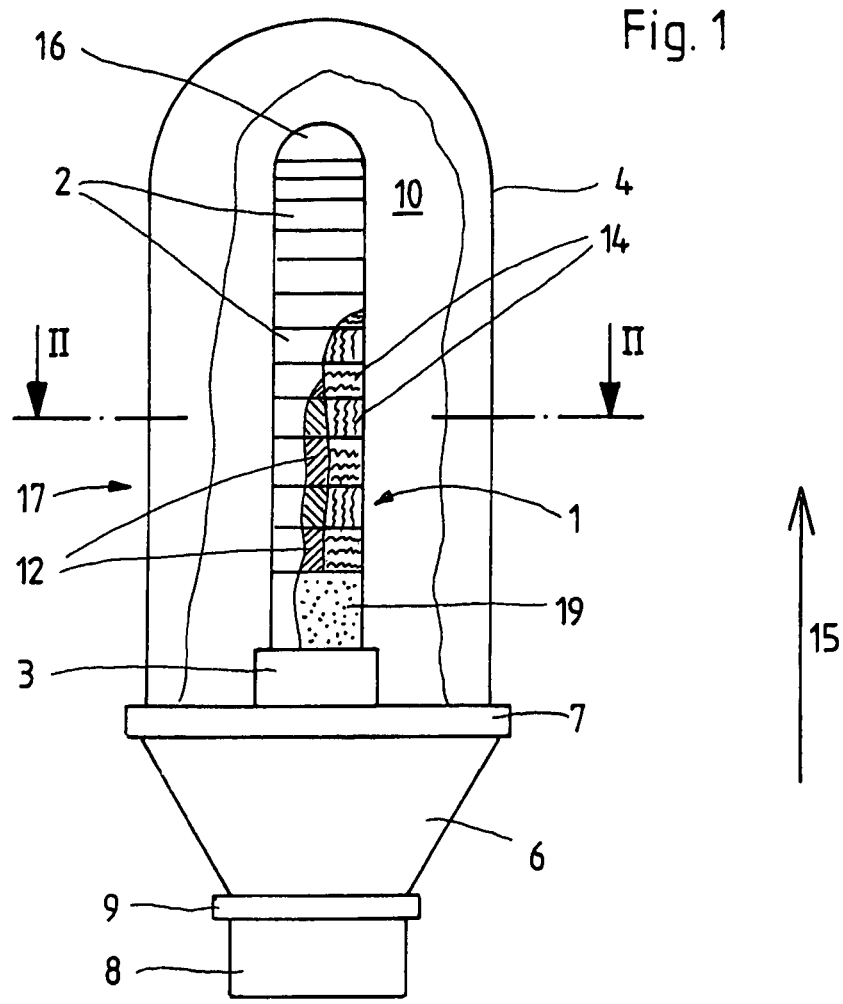
FIG. 1 shows a recombiner comprising a first embodiment of a recombiner system according to the invention.

FIG. 1 shows a partially cut side view of a recombiner 17 which has a recombiner system 1 according to the invention. In a way known by itself, the recombiner 17 is composed of a connecting sleeve 8, a sleeve element 6 that is superposed in the vertical direction 15, a container 4 made of a gastight material as well as a closing ring 7 that connects the container 4 to the sleeve element 6. Cams that are not represented in the fig. can be formed on the connecting sleeve 8 in order to fix the recombiner 17 at the cell opening of an accumulator that is not shown in the fig. in the way of a bayonet connection. A slip-on flange 9 that is placed above the connecting sleeve 8 in the vertical direction 15 can serve for receiving a conical nipple that is not shown in the fig. The recombiner system can furthermore have an ignition return safety device, such as for example in form of a frit or a valve, that is not represented in the fig. Such an ignition return safety device can be a component of a degasifying channel that is not represented in the fig.

Inside the volume space 10 encompassed by the container 4 a base 3 carried by the sleeve element 6 is placed, which base 3 can be formed like a pipe socket and serves for receiving the recombiner system 1 according to the invention.

The base 3, the sleeve element 6, the slip-on flange 9 and the connecting sleeve 8 are preferably realized as one integral component and are made of plastic. The container 4, which is also preferably made of plastic, is open on the side of the sleeve element and can comprise corresponding connecting or locking means on the side of the sleeve element for a connection to the sleeve element. Furthermore, the closing ring 7 serves for a safe fixation of the container 4 on the sleeve element 6.

In a way known by itself the recombiner system 1 according to the invention is formed like a bar, as it is visible in FIG. 1. According to the invention, the recombiner system 1 is formed by individual recombiner elements 2 that are superposed in the vertical direction 15. Herein, the most upper combination element 2 in the vertical direction carries a closing element 16 in form of a cover. The detailed structure of the recombiner elements 2 is disclosed in FIG. 2.

Figure 2:
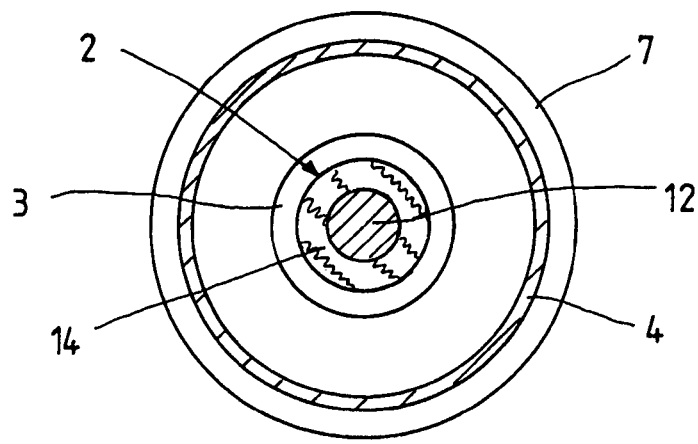
FIG. 2 shows a cut side view along cutting line II-II according to FIG. 1 of a recombiner element.

The recombiner element 2 shown in FIG. 2 is composed of a catalyst 12 on the one hand and a casing 14 made of porous material, for example ceramic, that encompasses the catalyst 12 on the other hand. The catalyst 12 can be of the usual type and be for example formed by a carrier element, the outer circumference of which is coated with a catalyst material. As catalyst material for example palladium can be used. The carrier element of the catalyst in turn is essentially formed by segments, as it is in particular visible in FIG. 1, and can be made of ceramic, alumina or the like. Generally a highly porous, heat and corrosion resistant material is preferred.

As exemplarily described by means of FIG. 2, the recombiner elements 2 are superposed in the vertical direction 15 for forming the recombiner system 1 according to the invention, wherein depending on the required recombination capacity of the recombiner system 1 a corresponding number of recombiner elements 2 can be combined with each other in a modular manner. For a position-safe arrangement of the recombiner elements 2, these ones can respectively carry fasteners that are not represented in the figs. on the large faces thereof.

As it is in particular visible in FIG. 2, the recombiner elements 2 are essentially formed like disks, but it is to be understood that also other geometries can be chosen.

As FIG. 1 shows, an absorber 19 is placed beneath the recombiner element 2 that is the lowest in the vertical direction 15, which absorber consists of an absorption material such as for example lead oxide, silver oxide, iron oxide, copper oxide or the like.

According to the embodiment of the invention shown in FIG. 1, the gases hydrogen and oxygen flow into the volume space 10 provided by the recombiner 17 via the connecting sleeve 8 and the sleeve element 6. Herein, they pass the absorber 19, wherein they are freed from impurities, in particular hydrides, and are thus purified. Then, the purified gases can get to the catalyst 12 via the porous casing 14, where they are recombined to form water.

Figure 3:
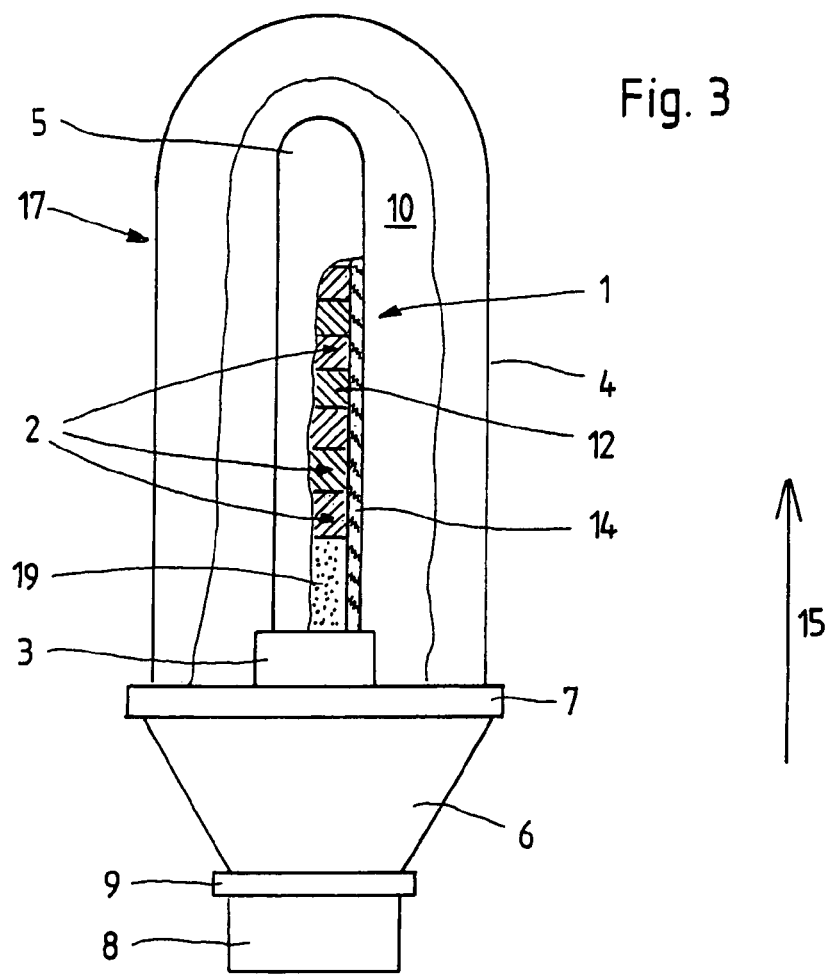
FIG. 3 shows a recombiner comprising a second embodiment of a recombiner system according to the invention.

In FIG. 3 an alternative embodiment of the recombiner system 1 is shown. In contrast to the exemplary embodiment according to the FIGS. 1 and 2, the casing 14 that encompasses the catalyst 12 is formed by a tube 5 which is made of a porous material, for example ceramic. In contrast to the exemplary embodiment according to the FIGS. 1 and 2, a separate casing 14 that encompasses the catalyst 12 is not provided. The recombiner elements 2 which are represented in FIG. 3 and only consist of a catalyst 12 are superposed in the vertical direction 15 inside a tube 5 for forming a recombiner system 1 according to the invention. This tube 5 is made of a porous material, for example ceramic, like also the casing 14 according to the exemplary embodiment of FIG. 1. The number of the recombiner elements 2 that are exemplarily represented in FIG. 3 depends on the desired recombination capacity that shall be obtained with the recombiner system 1, wherein the tube 5 corresponds to the height of the superposed recombiner elements 2 and has a corresponding length. The recombiner elements 2 form together with the tube 5 the recombiner system 1, wherein an absorber 19 is placed inside the tube 5 opposite the closed end section of the tube 5. As already explained above by means of FIG. 1, the gases hydrogen and oxygen at first flow through the absorber 19 on their way into the volume space 10 encompassed by the recombiner 17, and as a result they are purified. A recombination to form water is then realized at the catalyst 12, as described above.

Figure 4:
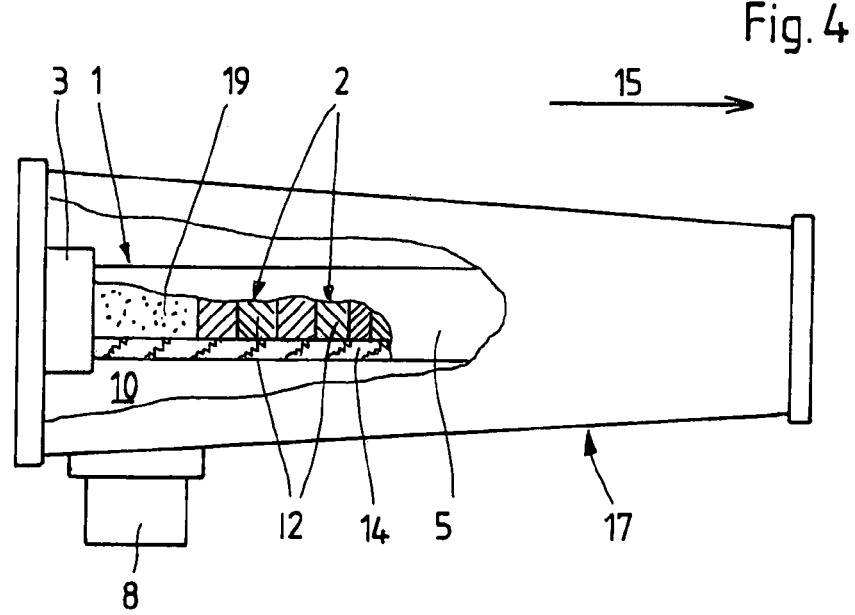
FIG. 4 shows the alternative embodiment of a recombiner.

FIG. 4 shows an alternative embodiment of a recombiner 17. In contrast to the previous exemplary embodiments, the recombiner 17 that is shown here is oriented transversely to the connecting sleeve 8, i.e. in the longitudinal direction of the accumulator cover that is not shown in the fig. But the design of the recombiner system 1 corresponds to the embodiment that has already been described above by means of FIG. 3, wherein the vertical direction 15 points to the right in the exemplary embodiment of FIG. 4 with respect to the drawing plane, in accordance with the orientation of the recombiner 17.

Figure 5:
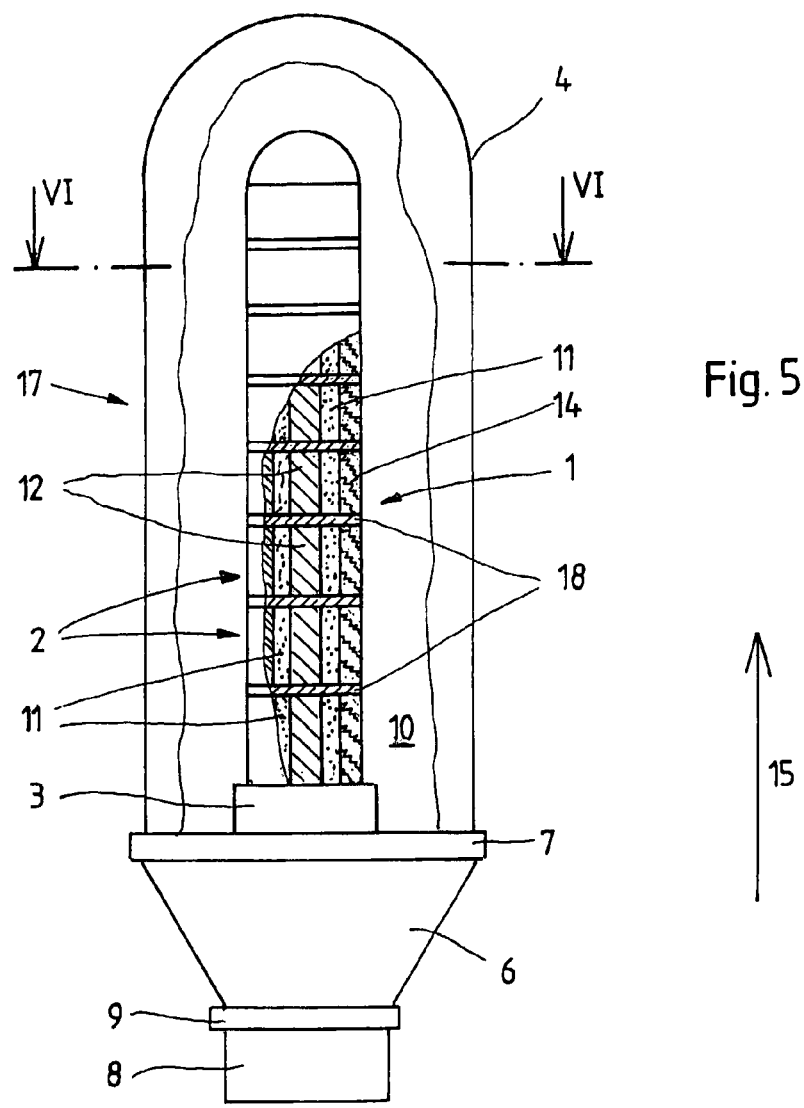
FIG. 5 shows a recombiner comprising an alternative embodiment of a recombiner system according to the invention and FIG. 6 shows a cut side view along cutting line VI-VI according to FIG. 5 of a recombiner element.
Figure 6:
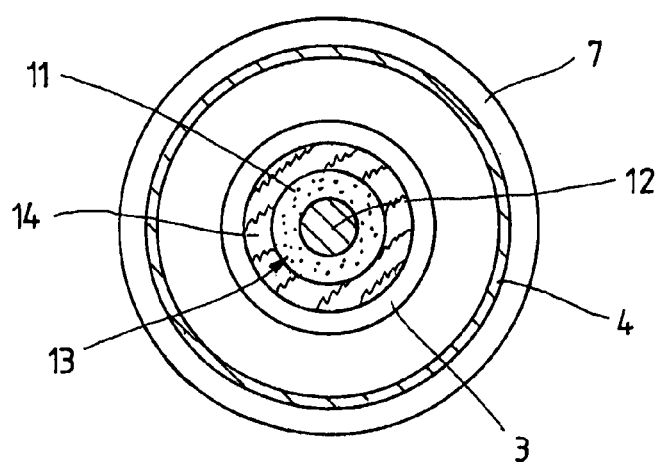

The FIGS. 5 and 6 show an alternative embodiment of the invention. The recombiner system 1 that is shown here is composed of recombiner elements 2 on the one hand and separation means 18 on the other hand, wherein recombiner elements 2 and separation means 18 are alternately arranged in the vertical direction 15.

In contrast to the exemplary embodiments according to FIGS. 1 through 4 the recombiner elements 2 of the exemplary embodiment according to FIGS. 5 and 6 have a modular catalyst group 13. The modular catalyst group 13 consists of a catalyst 12 on the one hand and an absorption material 11 on the other hand which encompasses the catalyst 12 like a casing, as it is in particular visible in FIG. 6. Both the catalyst 12 and the absorption material 11 can be of the usual type. The modular catalyst group 12 of each recombiner element 2 is encompassed by a casing 14 made of a porous material. The separation means 18 that separate the individual recombiner elements 2 from each other and that are respectively placed between two recombiner elements 2 that are superposed in the vertical direction 15, as represented in FIG. 5, are made of the same material.

It is the purpose of the separation means 18 to support a multistage operation of the recombiner system 1, such that the water vapour that precipitates in the absorption material 11 of a recombiner element 2 does not spread in an uncontrolled way over the absorption material 11 of the adjacent recombiner elements 2. Hereby, an uncontrolled, partial functional breakdown of the absorption material 11 can be advantageously avoided to a great extend.

As a variation of the embodiment shown in FIGS. 5 and 6 it can also be provided that the recombiner elements 2 comprising the modular catalyst group 13 are arranged inside a tube made of a porous material. According to this alternative embodiment the recombiner elements 2 and the separation means 18 have to be alternately introduced into this tube 5. As it is visible by the previously explained exemplary embodiment, the use of separation means is optional. Therefore, it is clear that separation means can also be used in the embodiments according to FIGS. 1 through 4. It is also possible to omit the separation means in the embodiments according to FIGS. 5 and 6.

Figures 7, 8:
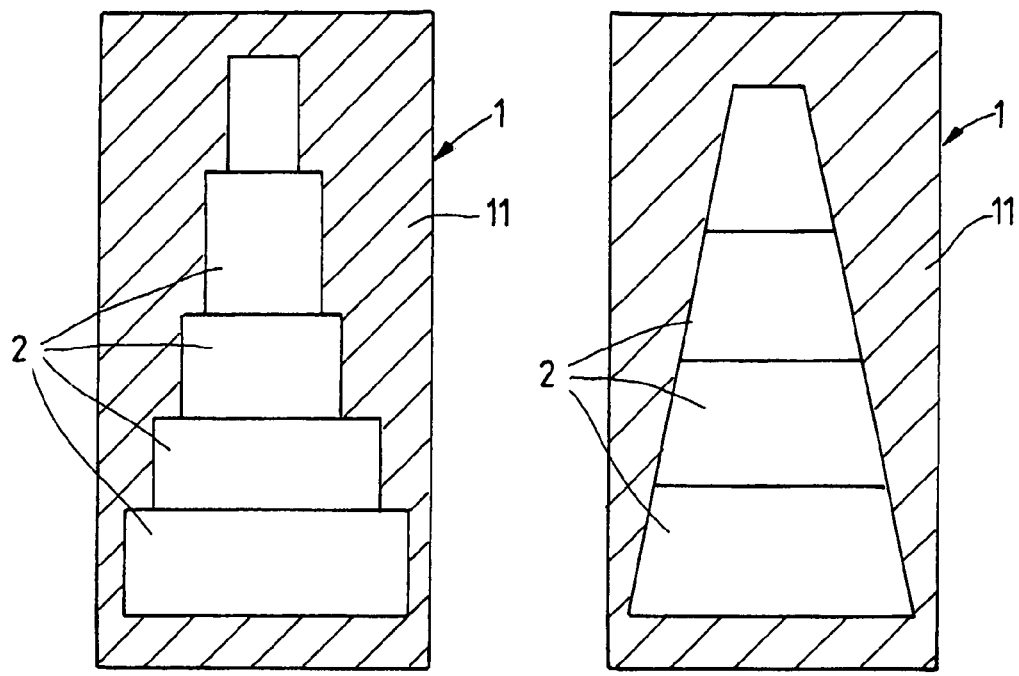
FIG. 7 shows a recombiner system according to an alternative embodiment.
FIG. 8 shows a recombiner system according to another alternative embodiment and FIG. 9 shows a recombiner system according to another alternative embodiment.

In FIGS. 7 and 8 alternative embodiments of the recombiner system 1 according to the invention are represented.

FIG. 7 shows a recombiner system 1 that is formed by a plurality of superposed recombiner elements 2 in the vertical direction, as already described above with reference to the preceding figures. The particularity of this recombiner system 1 is that the individual recombiner elements 2 have a different size. As it can be seen, the recombiner elements 2 are superposed in a conical way, wherein the lowest recombiner element 2 has the largest or smallest base—depending on the configuration of the conical shape—in comparison to the other recombiner elements 2. As it is visible in FIG. 7, the structure is stepped.

Except the lowest recombiner element 2, the recombiner elements 2 are encompassed by an absorption material 11. In this context it may be provided for example that the absorption material 11 forms a kind of sleeve in which the recombiner elements 2 are arranged. For a greater clarity an optional casing made of a porous material is not represented in FIG. 7.

FIG. 8 shows an alternative embodiment that is a constructional variation of the recombiner system represented in FIG. 7. According to this embodiment, the individual recombiner elements 2 are also superposed in the vertical direction in a conical way. However, in contrast to the exemplary embodiment according to FIG. 7 the structure is not stepped. Herein, it can also be provided in the sense of the invention that the recombiner elements 2 are combined with each other to form an integral entity. Herein, the multistage structure of the recombination process results from the conical design of the recombiner elements 2 that are combined with each other to form a common entity, since the cross sectional area of the cone decreases in the vertical direction. This cross sectional taper in the vertical direction is responsible of the multistage recombination process according to the invention.

Figure 9:
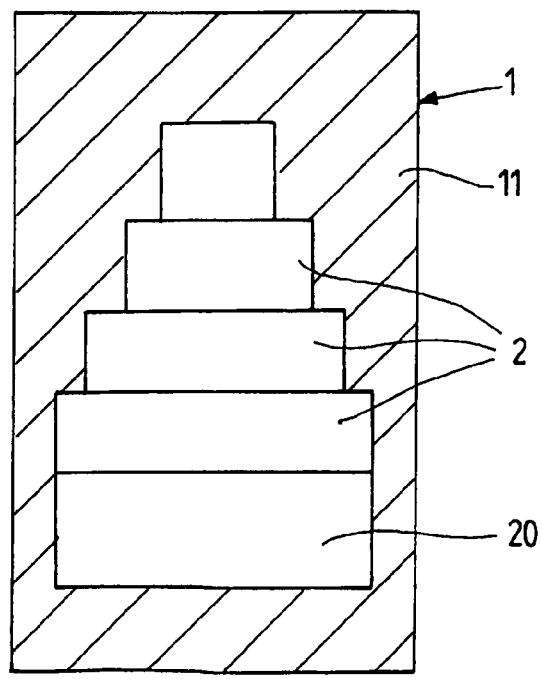

Another alternative embodiment of the recombiner system is shown in FIG. 9. In contrast to the embodiment according to FIG. 7 it is provided in the embodiment according to FIG. 9 that an empty space 20 is provided beneath the lowest recombiner element 2 between the last recombiner element 2 and the absorption material 11.

It is to be understood that the embodiments shown in FIGS. 7 through 9 are only exemplary and that the recombiner system 1 can for example also be configured such that the lowest recombiner element 2 has the smallest base of all used recombiner elements 2.

The absorption material 11, as it is exemplarily represented in the FIGS. 7 through 9, can have any structure. Thus, for example the use of pressed balls is possible. The only function of the absorption material is finally to be water permeable and to serve for a detoxification on the one hand and to serve as gas blocker on the other hand.

The above described embodiments shall only serve for the detailed explanation of the invention and are thus not limiting. The represented modular groups are not represented in correct scale. Besides, it is within the scope of the invention to provide recombiner elements 2 which differ from each other with respect to their nature, size, recombination capacity or the like. For the invention it is only decisive that the recombiner system 1 is formed by individual recombiner elements 2 which can be optionally combined with each other in a modular manner, wherein it can either be provided that each one of the individual recombiner elements 2 only comprises a catalyst or a modular catalyst group composed of catalyst and absorption material. In the first case a separate absorber made of an absorption material is arranged beneath the lowest recombiner element. The use of separation means 18 is optional and in no way compulsory. In the figs. the same reference numerals indicate the same parts.

The example that has been described by means of the above explained figures is also in so far not limiting that the recombiner system according to the invention is not only used in accumulators. It can rather be provided to use the recombiner system generally together with energy accumulators or energy converters, thus for example also in fuel cells. Herein, energy accumulators or energy converters within the scope of the invention are such accumulators or converters which at least release hydrogen.

LIST OF REFERENCE NUMERALS 1 recombiner system
2 recombiner element
3 base
4 container
5 tube
6 sleeve element
7 closing ring
8 connecting sleeve
9 slip-on flange
10 volume space
11 absorption material
12 catalyst
13 modular catalyst group
14 casing
15 vertical direction
16 closing element
17 recombiner
18 separation means
19 absorber
20 empty space

The invention claimed is:

1. A recombiner system for catalytically recombining hydrogen that is produced in energy accumulators or energy converters, the system being formed by individual recombiner elements that can be combined with each other in a modular manner, said recombiner elements respectively comprising at least one catalyst, characterized in that the recombiner elements are superposed in the vertical direction inside a tube made of porous material, one end of which is closed.

2. A recombiner system according to claim 1, characterized in that the catalyst of each recombiner element is encompassed by a casing made of a porous material.

3. A recombiner system according to claim 1, characterized in that the recombiner element that is the most upper in the vertical direction is provided with a closing element.

4. A recombiner system according to claim 1, characterized in that an absorber is placed beneath the recombiner element that is the lowest in the vertical direction.

5. A recombiner system according to claim 1, characterized in that the large faces of the recombiner elements and/or the absorber respectively carry fasteners.

6. A recombiner system according to claim 1, characterized in that an absorber is arranged at the other end inside the tube, wherein the inner diameter of the tube essentially corresponds to the outer diameter of the absorber.

7. A recombiner system according to claim 1, characterized in that the catalyst of each recombiner element is encompassed by a casing formed by an absorption material.

8. A recombiner system according to claim 1, characterized in that the composition and the material class of an absorption material correspond to the material of the absorber.

9. A recombiner system according to claim 7, characterized in that the catalyst forms a modular catalyst group together with the casing made of an absorption material that encompasses the catalyst.

10. A recombiner system according to claim 9, characterized in that the modular catalyst group of each recombiner element is encompassed by a casing made of a porous material.

11. A recombiner system according to claim 7, characterized in that the recombiner elements are superposed in the vertical direction.

12. A recombiner system according to claim 7, characterized in that the recombiner element that is the most upper in the vertical direction is provided with a closing element.

13. A recombiner system according to claim 7, characterized in that the large faces of the recombiner elements respectively carry fasteners.

14. A recombiner system according to claim 7, characterized in that the recombiner elements are superposed in the vertical direction inside a tube made of porous material, the one end of which is closed, wherein the inner diameter of the tube essentially corresponds to the outer diameters of the recombiner elements.

15. A recombiner system according to claim 7, characterized in that the recombiner elements are superposed in the vertical direction with respective interposition of a separation means.

16. A recombiner system according to claim 15, characterized in that the separation means is made of porous material.

17. The recombiner system according to claim 16, wherein said porous material is ceramic.

* * * * *